US010173441B2

(12) United States Patent
Takeshita et al.

(10) Patent No.: US 10,173,441 B2
(45) Date of Patent: Jan. 8, 2019

(54) APPARATUS FOR PROCESSING MEDIA

(71) Applicants: Naoto Takeshita, Yamanashi-ken (JP); Tetsuya Noda, Yamanashi-ken (JP); Yasutake Ohshiro, Yamanashi-ken (JP); Hiroaki Moroboshi, Yamanashi-ken (JP); Hiroshi Mochizuki, Yamanashi-ken (JP)

(72) Inventors: Naoto Takeshita, Yamanashi-ken (JP); Tetsuya Noda, Yamanashi-ken (JP); Yasutake Ohshiro, Yamanashi-ken (JP); Hiroaki Moroboshi, Yamanashi-ken (JP); Hiroshi Mochizuki, Yamanashi-ken (JP)

(73) Assignee: CANON FINETECH NISCA INC., Misato-Shi, Saitama (JP)

( * ) Notice: Subject to any disclaimer, the term of this patent is extended or adjusted under 35 U.S.C. 154(b) by 0 days.

(21) Appl. No.: 15/635,806

(22) Filed: Jun. 28, 2017

(65) Prior Publication Data
US 2018/0001673 A1    Jan. 4, 2018

(30) Foreign Application Priority Data

Jul. 1, 2016   (JP) .................................. 2016-131916
Jul. 1, 2016   (JP) .................................. 2016-131917
Jul. 7, 2016   (JP) .................................. 2016-134691

(51) Int. Cl.
*B41J 11/00* (2006.01)
(52) U.S. Cl.
CPC ................................ *B41J 11/0095* (2013.01)

(58) Field of Classification Search
CPC .... B41J 11/0095; B41J 13/00; B41J 13/0009; B41J 15/00; B41J 15/04; B41J 15/044; B41J 15/046
See application file for complete search history.

(56) References Cited

U.S. PATENT DOCUMENTS 5,768,143 A * 6/1998 Fujimoto ............. G06Q 20/355
235/380

FOREIGN PATENT DOCUMENTS

JP        2005-075603 A    3/2005

* cited by examiner

*Primary Examiner* — Kristal Feggins
(74) *Attorney, Agent, or Firm* — Manabu Kanesaka

(57) ABSTRACT

The present invention is to provide a media processing apparatus for enabling a plurality of discharge sections disposed one side of the apparatus to be disposed parallel inside saved space, the media processing apparatus is provided with a plurality of discharge sections (correct card discharge section and error card discharge section) disposed on one side of an apparatus housing, and a discharge member (card reverse section) that discharges a card C to each discharge section. In such a card processing apparatus, a width dimension (length dimension in the discharge direction of the card) of a discharge stacker of the first card discharge section is wider than a width dimension of the card C, and a width dimension of a frame body of the error card discharge section is narrower than the width dimension of the card C.

16 Claims, 12 Drawing Sheets

APPARATUS FOR PROCESSING MEDIA

TECHNICAL FIELD

The present invention relates to an apparatus for processing card-shaped media for performing printing processing and data processing on supplied card-shaped recording media, and subsequently, corresponding to the processing content, sorting the card-shaped recording media to a plurality of types of discharge sections such as a discharge stacker and reject to discharge.

BACKGROUND ART

Conventionally, card processing apparatuses have widely been known which perform printing processing and data processing on a card-shaped recording medium (hereinafter, referred to as card) and discharge the processed card to a discharge section. In Patent Document 1 is disclosed a card processing apparatus which performs printing processing on a supplied card in a printing section, feeds the printing-processed card to a rotation transport body, turns the rotation transport body a predetermined angle, and thereby sorts the card to a tray, stacker or reject to discharge.

PRIOR ART DOCUMENT

Patent Document

[Patent Document 1] Japanese Patent Application Publication No. 2005-75603

Disclosure of Invention

Problems to be Solved by the Invention

In the card processing apparatus as described in Patent Document 1, in the configuration for discharging to the stacker section and reject section from the rotation transport body, disclosed is a configuration where the stacker section and reject section of the same size (width dimension) are disposed parallel on one side of the apparatus. However, usually, since an error card is discharged to the reject section, and the reject section does not need to collect cards, it is not necessary to make the width dimension of the reject section wider than the card width (length dimension in a card transport direction) like the stacker section. On the other hand, since the discharge stacker collects discharged cards, it is necessary to make the width dimension of the discharge stacker wider than the card width.

Accordingly, when the discharge stacker and reject stacker of the same width dimension are disposed parallel as in Patent Document 1, the apparatus size is increased correspondingly thereto. In view of the aforementioned matter, it is an object of the present invention to provide a compact card processing apparatus in a card processing apparatus including a plurality of discharge sections.

Means for Solving the Problem

In order to attain the above-mentioned object, in the present invention, a media processing apparatus for performing processing on recording media to discharge is provided with an apparatus housing, a medium processing section that performs predetermined processing on a recording medium, a discharge member that discharges the recording medium processed in the medium processing section, and a plurality of discharge sections to which the recording medium is discharged by the discharge member, where a plurality of discharge sections is disposed parallel in the same direction as a discharge direction of the recording medium by the discharge member on one side of the apparatus housing, and is comprised of a first discharge section including a first frame body and a second discharge section including a second frame body, a length dimension in the discharge direction of the first frame body is wider than a length dimension in the discharge direction of the recording medium, and a length dimension in the discharge direction of the second frame body is shorter than the length dimension in the discharge direction of the recording medium.

Further, in order to attain the above-mentioned object, in a second aspect of the present invention, a media processing apparatus for performing processing on recording media to discharge is provided with an apparatus housing, a medium processing section that performs predetermined processing on a recording medium, an error detection member that detects whether or not the recording medium is correctly processed in the medium processing section, a discharge member that discharges the recording medium processed in the medium processing section, and a plurality of discharge sections to which the recording medium is discharged by the discharge member, where a plurality of discharge sections is disposed parallel in the same direction as a discharge direction of the recording medium by the discharge member on one side of the apparatus housing, and is comprised of a first discharge section including a first frame body and a second discharge section including a second frame body of which a length dimension in the discharge direction is shorter than that of the first frame body, and the discharge member discharges a recording medium with an error detected in the error detection member to the second discharge section.

Advantageous Effect of the Invention

According to the present invention, in the media processing apparatus provided with a plurality of discharge sections on one side of the apparatus, by making the width dimension (length dimension in the discharge direction of media) that does not need to collect discharged media narrower than the width dimension of the media, it is possible to obtain the effect that the entire apparatus is made compact.

MODE FOR CARRYING OUT THE INVENTION

The present invention relates to a processing apparatus for cards and the like which is capable of efficiently transporting recording media such as cards, and executing desired recording processing efficiently and reliably, and is characterized by arranging a plurality of transport paths to transport recording media in a rational manner and thereby making the apparatus compact. Herein, Embodiments will be described below where a card-shaped plastic substrate is used as a recording medium, and various types of image information such as letters and image are printed or recorded on a surface of the card to create a credit card, license card, IC card and the like, and the type of recording media and recording method are not limited particularly.

Figure 1:
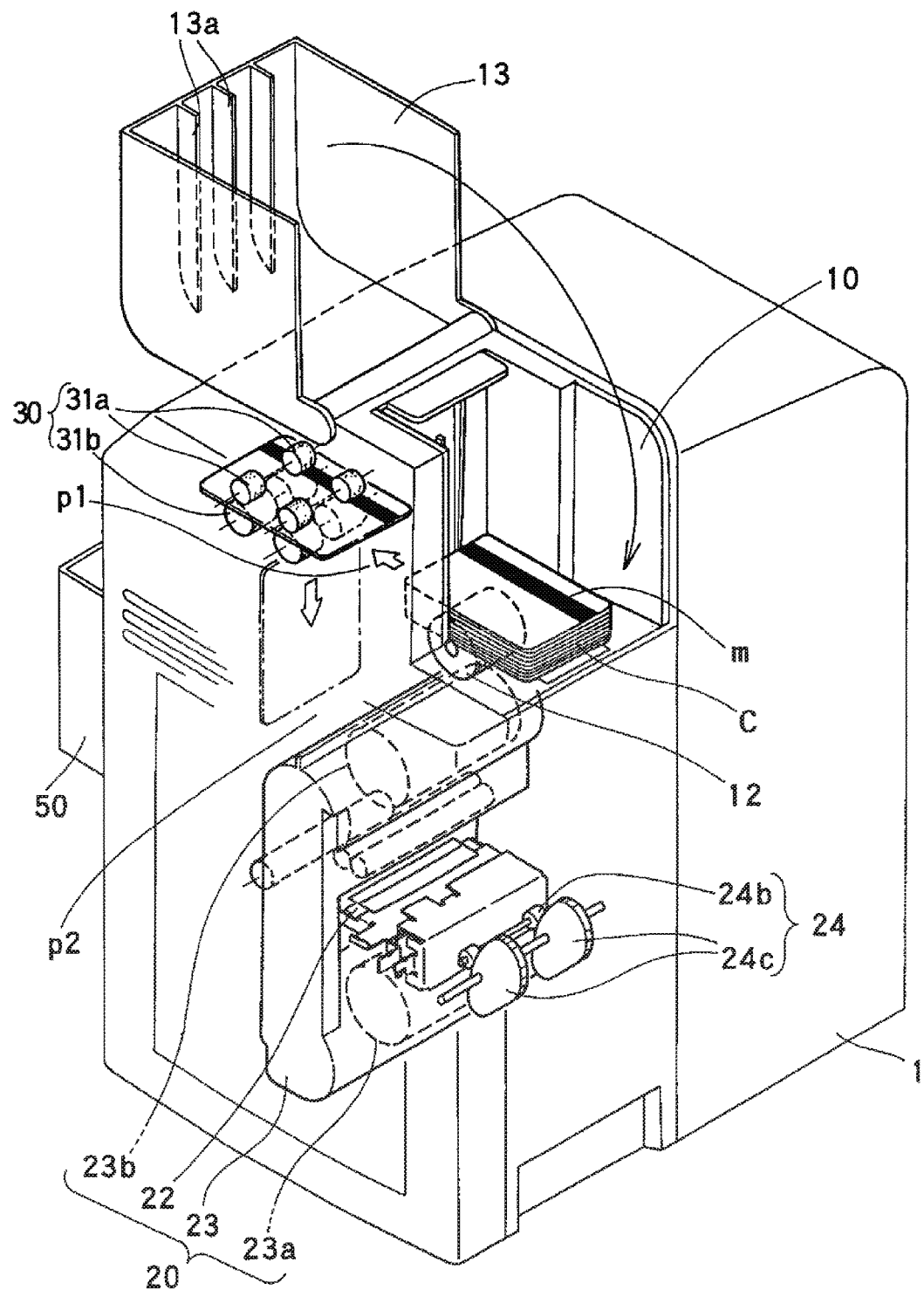
FIG. 1 is a schematic perspective view obtained by partially viewing through a card processing apparatus according to the present invention.
Figure 2:
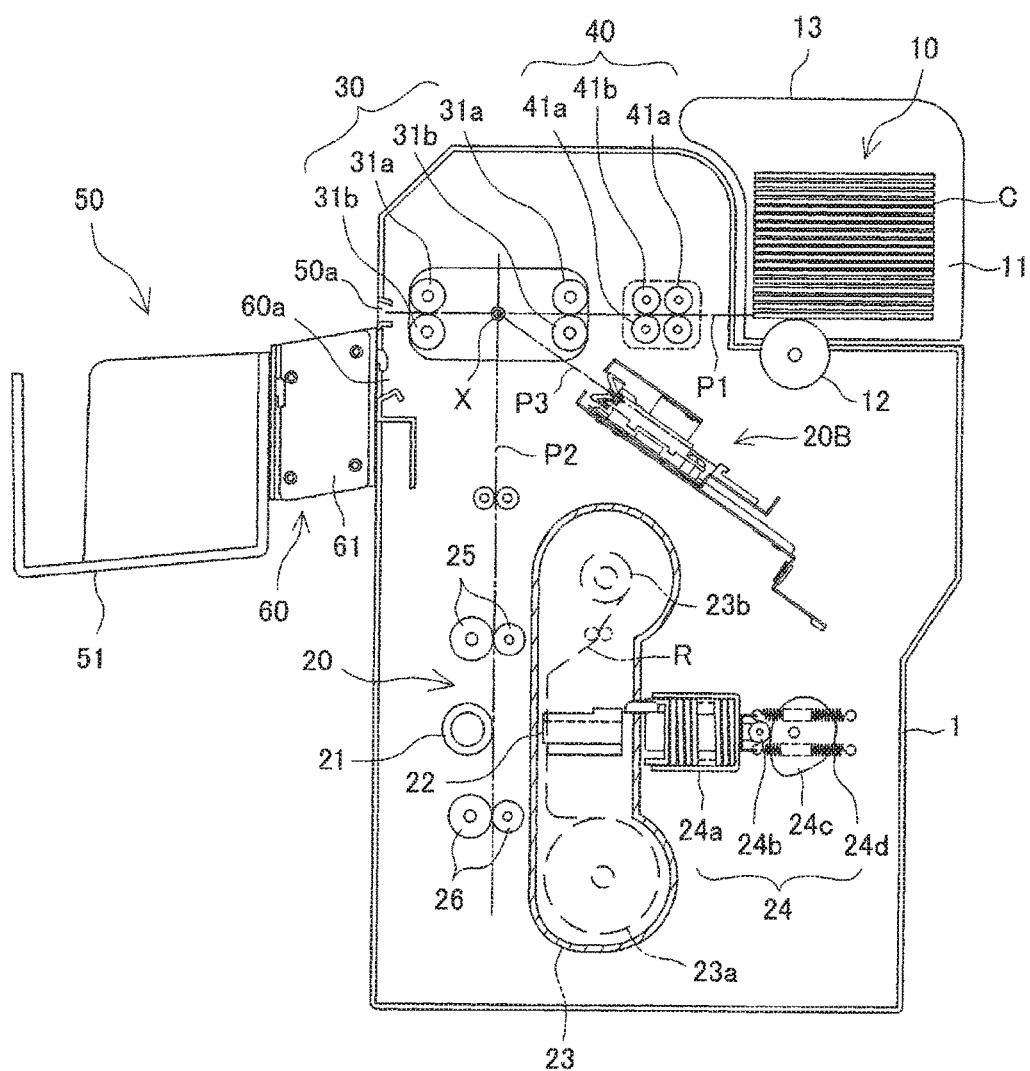
FIG. 2 is a front view of a card processing apparatus of Embodiment 1.
Figure 3:
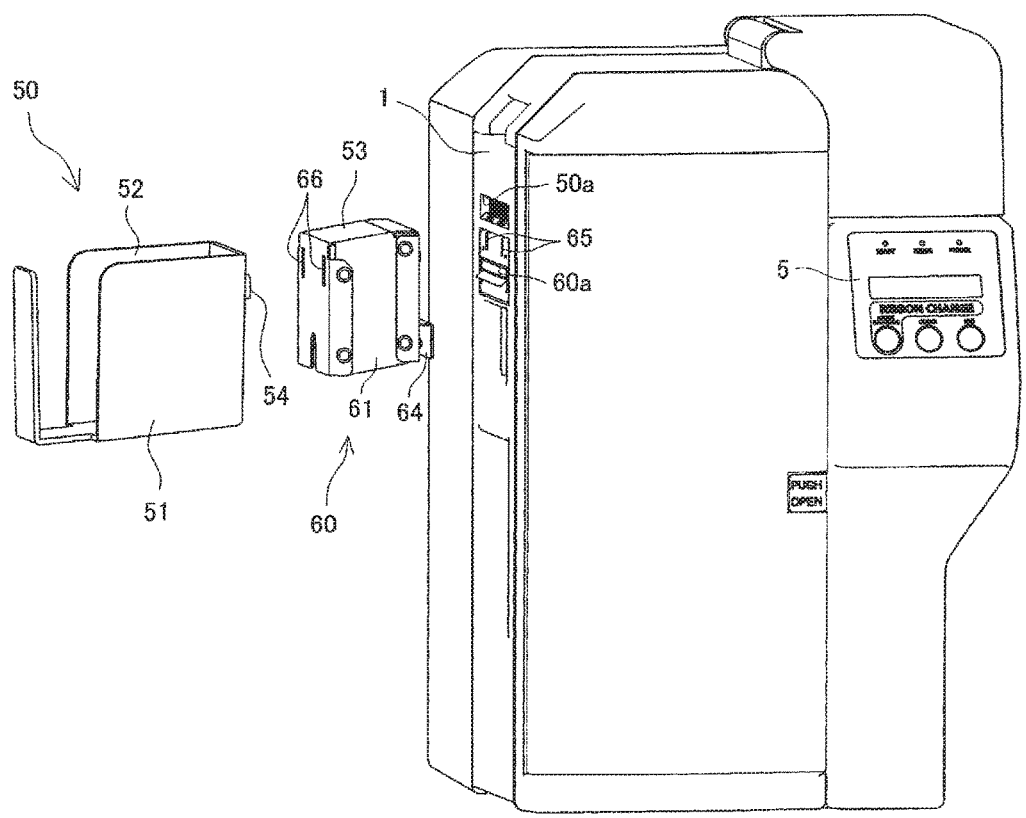
FIG. 3 is an exploded perspective view of a correct card discharge section and error card discharge section of the card processing apparatus of Embodiment 1.
Figure 4:
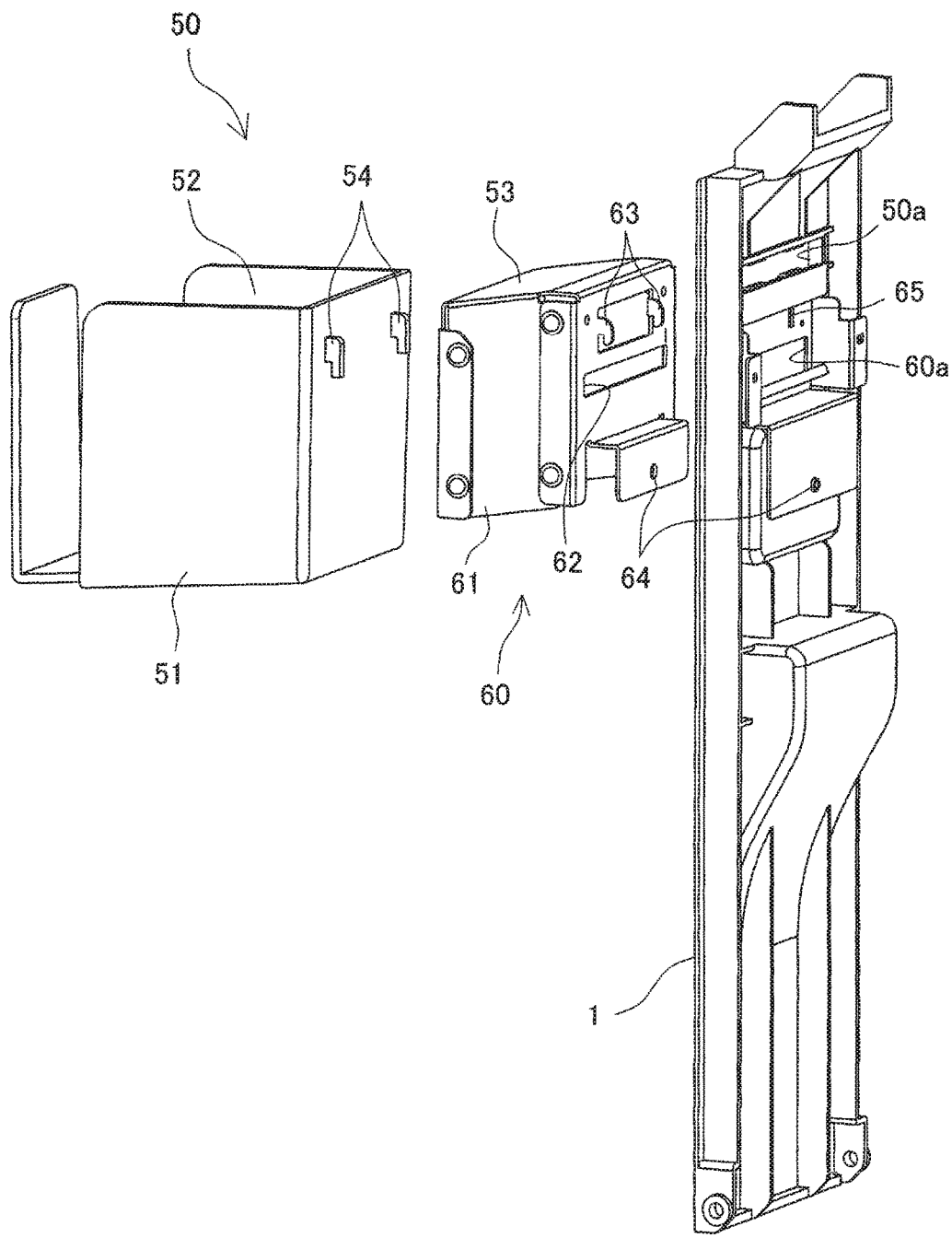
FIG. 4 is another exploded perspective view of the correct card discharge section and error card discharge section of the card processing apparatus of Embodiment 1, looking from an angle different from that in FIG. 3.

A card processing apparatus shown in FIGS. 1 and 2 as Embodiment 1 of the present invention is comprised of a first transport path p1 arranged approximately horizontally inside a housing 1, a card supply section 10 which stores one or more blank cards (recording media) C to feed to the first transport path p1 on a card-by-card basis, a second transport path p2 arranged in a shape approximately orthogonal to the first transport path p1 i.e. approximately perpendicularly, a third transport path p3 arranged in a slating direction between the first transport path p1 and the second transport path p2, a printing section 20A that prints various types of information at least on one surface of the supplied card C, and a card reverse section 30 provided at an intersection point of the first transport path p1, second transport path p2 and third transport path p3.

The card supply section 10 is comprised of a card stacker 11 that stores one or more blank cards C in a stacked shape, a kick roller 12 which is provided on the bottom of the card stacker 11 and rotates to feed out cards on a card-by-card basis from the card stacker 11, and a cover 13 that is opened and closed to enable at least a part of the card stacker 11 to be opened.

The card stacker 11 usually has an open slot that permits passage of only a single card in a position facing the transport path p1, and by rotating the kick roller 12 in contact with the lowest-position card of the cards C in the stacked shape, feeds only the lowest-position card to the first transport path p1.

The open/close cover 13 is swingably attached to an upper portion of the housing 1 to be capable of being opened upward. The open/close cover 13 is provided with a card alignment piece 13a inside, and in a state in which the open/close cover 13 is opened upward with a plurality of blank cards C mounted in the stacked manner inside the card stacker 11, by closing the open/close cover 13, the card alignment piece 13a presses a rear end of a bunch of sheets, and is thereby able to align the bunch of cards.

The printing section 20 that is a first information recording section in this Embodiment adopts a configuration of thermal transfer printer for thermal-transferring information such as letters and image to one surface of a card C that is a recording medium to record using thermal transfer ink, but in the present invention, the type and recording scheme of recording information are not limited.

The printing section 20 constituting a thermal transfer printer herein is comprised of a platen roller 21 provided in a recording position Sr of the second transport path p2, a thermal head 22 provided to be able to move and retract to/from the platen roller 21, and an ink cartridge 23 with an internal ink ribbon R coated with thermal transfer ink. Transport roller pairs 25, 26, which rotate and operate in synchronization with each other to shift the card back and forth with respect to the recording position Sr, are provided along the second transport path p2.

The ink ribbon R stored in the ink cartridge 23 passes through between the platen roller 21 and the thermal head 22 from a ribbon supply reel 23a, and is wound around a ribbon take-up reel 23b. In thermal-transferring information of letters, image or the like to the card shifting along the second transport path p2 to record, the thermal head 22 is pressed against the surface of the card through the ink ribbon R, while selectively operating heating elements of the thermal head 22, and it is thereby possible to transfer thermal transfer ink components applied to the ink ribbon R to the surface of the card and draw desired information.

Back-and-forth motion of the thermal head 22 with respect to the platen roller 21 is executed by a back-and-forth drive unit 24 comprised of a holder 24a that holds the thermal head 22 detachably, a driven roller 24b fixed to the holder 24a, a non-circular cam 24c that rotates, while being brought into contact with the driven roller 24b, and a spring 24d that brings the holder 24a into press-contact with the cam 24c. The Embodiment shown in the figure adopts the configuration where a head unit with the thermal head 22 held therein is attachable and detachable with respect to the holder 24a, but the present invention is not particularly limited to this configuration.

Such thermal transfer recording method and structure of the thermal transfer printer are particularly not novel techniques, and it is possible to use a printer unit of conventional thermofusible type thermal printer, thermal sublimation type thermal printer or the like corresponding to the purpose. Further, the structure of the back-and-forth drive unit that moves the thermal head 22 back and forth with respect to the platen roller 21 is also not limited particularly.

In the third transport path p3 is provided an IC reader writer 20B that is a second information recording section. The IC reader writer 20B is comprised of an information write head 27 of a terminal unit of an IC writer to IC-record information into an IC chip formed in a card surface shown in a credit card or the like, and the like.

In the information write head 27, as long as a recording object is a magnetic card, the head may be an information write head to write information into a magnetic stripe inside the card. Further, the head may be a non-contact IC reader writer that performs IC recording processing in non-contact.

Figure 5:
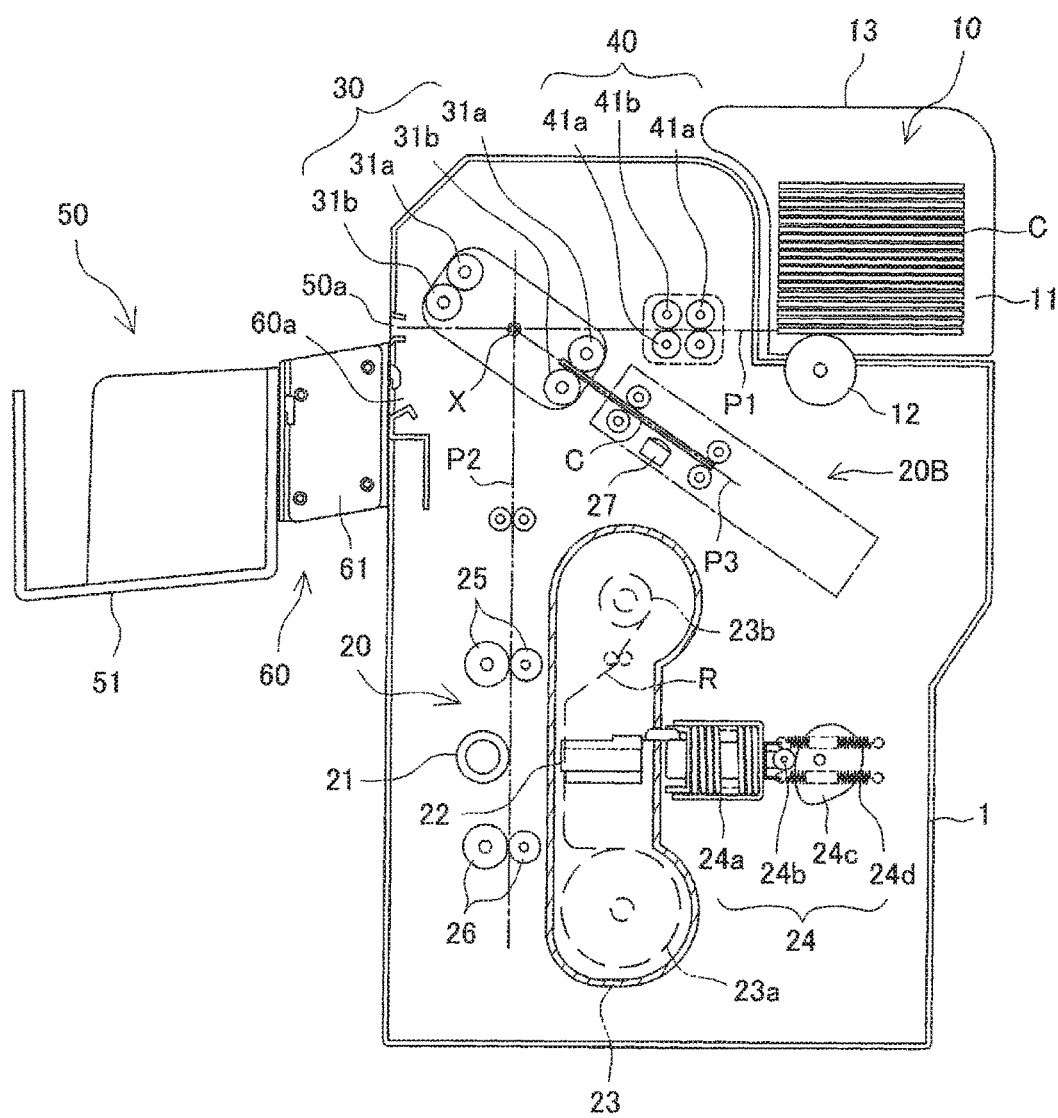
FIG. 5 is a view illustrating a state in which the card processing apparatus of Embodiment 1 performs information recording processing.

The card reverse section 30 turns to an IC read/write position shown in FIG. 5 with the card C nipped by pinch rollers 31a, 31b, in order to position the IC chip of the card in the information write head 27 of the IC reader writer 20B. In this position, with one end of the card C nipped by the pinch rollers 31a, 31b, the pinch rollers 31a, 31b are driven to move the other end of the card to the IC reader writer 20B.

When the IC chip of the card is transported to a position brought into contact with the information write head 27, the information recording processing is started by the information write head 27. When the information recording processing is finished, the pinch rollers 31a, 31b are driven in the opposite direction to pull the card C back to the card reverse section 30, and the flow shifts to the next processing. In addition, in the case where it is not possible to communicate with the IC chip for a certain time, the case is regarded as a communication error, and the card is judged as an error card.

The card reverse section 30 positioned in the intersection point X of the first transport path p1, second transport path p2 and third transport path p3 has the function of feeding the card C from the first transport path p1 to the second transport path p2, and then, from the first transport path p1 to the third transport path p3, or alternatively in the opposite direction, and the function of rotating the card C to reverse the card so as to apply printing to arbitrary one surface or both surfaces of the card in the printing section 20.

The card reverse section 30 herein is comprised of pinch rollers 31a, 31b paired to be able to nip a card, and a rotation frame 32 that supports the pinch rollers 31a, 31b rotatably and that rotates about the intersection point X of the first transport path p1 and second transport path p2.

The pinch rollers 31a, 32b come into press-contact with each other with the first transport path p1 therebetween when the rotation frame 32 is in a horizontal state, come into press-contact with each other with the second transport path p2 therebetween when the frame is in a perpendicular state, and then, come into press-contact with each other with the third transport path p3 therebetween when the frame is in a slanting state. One of paired pinch rollers is a drive roller, and the other one is a driven roller.

It is possible to execute rotation of the rotation frame 32 and rotation of the pinch rollers 31a, 31b by operating a drive system (not shown) for driving in synchronization with the rotation. When the rotation frame 32 is rotated with the card nipped between the pinch rollers 31a, 31b, the pinch rollers rotate together and displace the card. Therefore, in rotating the rotation frame 32, the pinch rollers are rotated reversely by the same angle rotation amount. In order to prevent the pinch rollers 31a, 31b from rotating together in rotating the rotation frame 32, the rotation frame 32 and the pinch rollers 31a, 31b may be driven independently.

However, the present invention is not particularly limited to the above-mentioned means, and any configurations may be adopted which have the function of carrying the card among the first transport path, second transport path and third transport path, or rotating and rotating reversely the card.

The card reverse section 30 of this Embodiment turns to four positions described below to receive and deliver a card. The first position is an initial position shown in FIG. 2. This position is a card receiving position for receiving a card transported from the card stacker 11 through the first transport path p1, and a correct card discharge position (see FIG. 7) to discharge a correct card that is processed correctly to a discharge stacker 51. This position is determined to be 0 degree in rotation angle.

The second position is an IC read/write position shown in FIG. 5. This position is a position where the rotation frame 32 is turned 325 degrees counterclockwise from the card receiving position described above, and in this state, the card is transported to the IC reader writer 20B via the third transport path p3.

Figure 6:
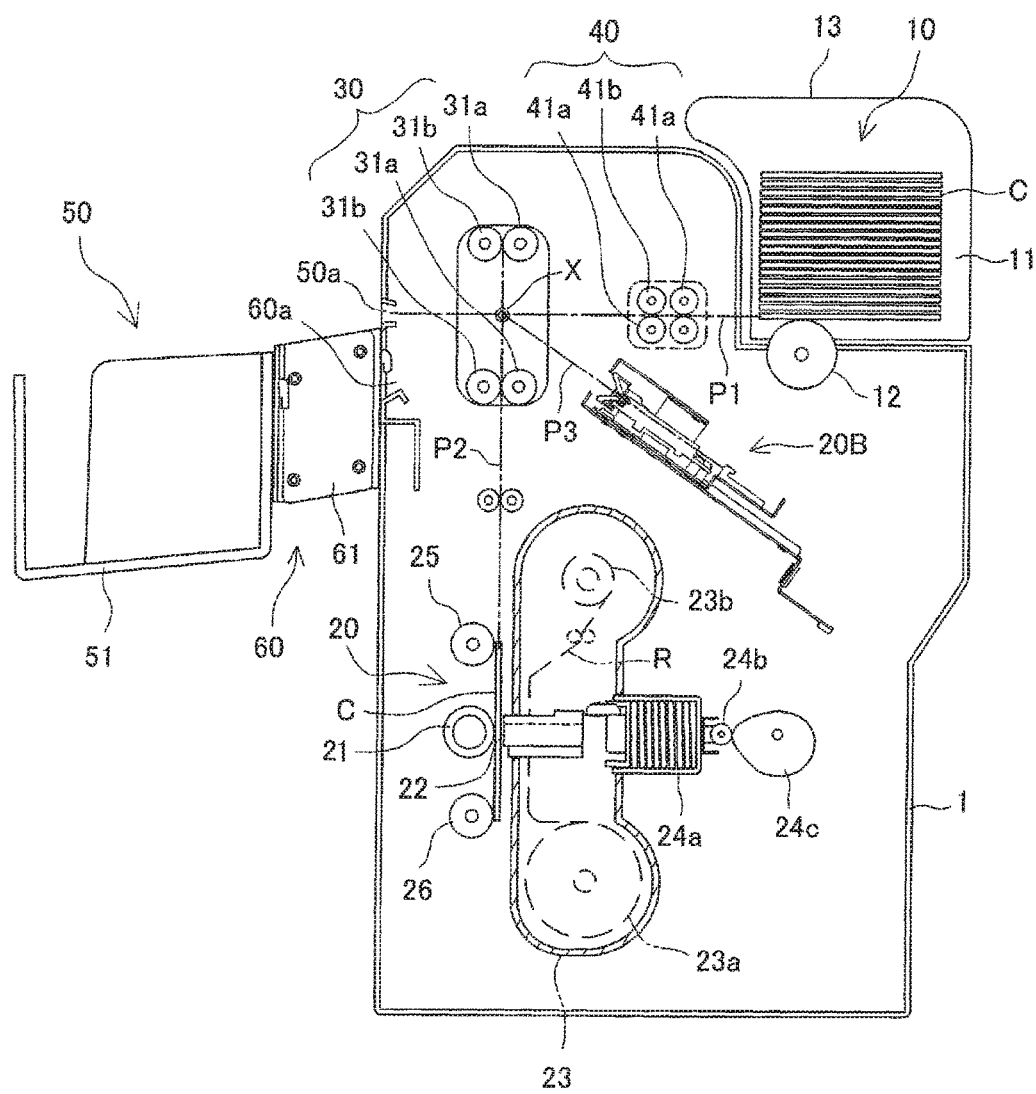
FIG. 6 is a view illustrating a state in which the card processing apparatus of Embodiment 1 performs printing processing.

The third position is a printing position shown in FIG. 6. This position is a position where the rotation frame 32 is turned 90 degrees counterclockwise from the card receiving position described above, and in this state, the card is transported to the printing section 20 via the second transport path p2. In addition, in the case of performing two-sided printing on the card, in order to reverse the side of the card, the rotation frame 32 is turned 180 degrees from the state in the printing position.

Figure 8:
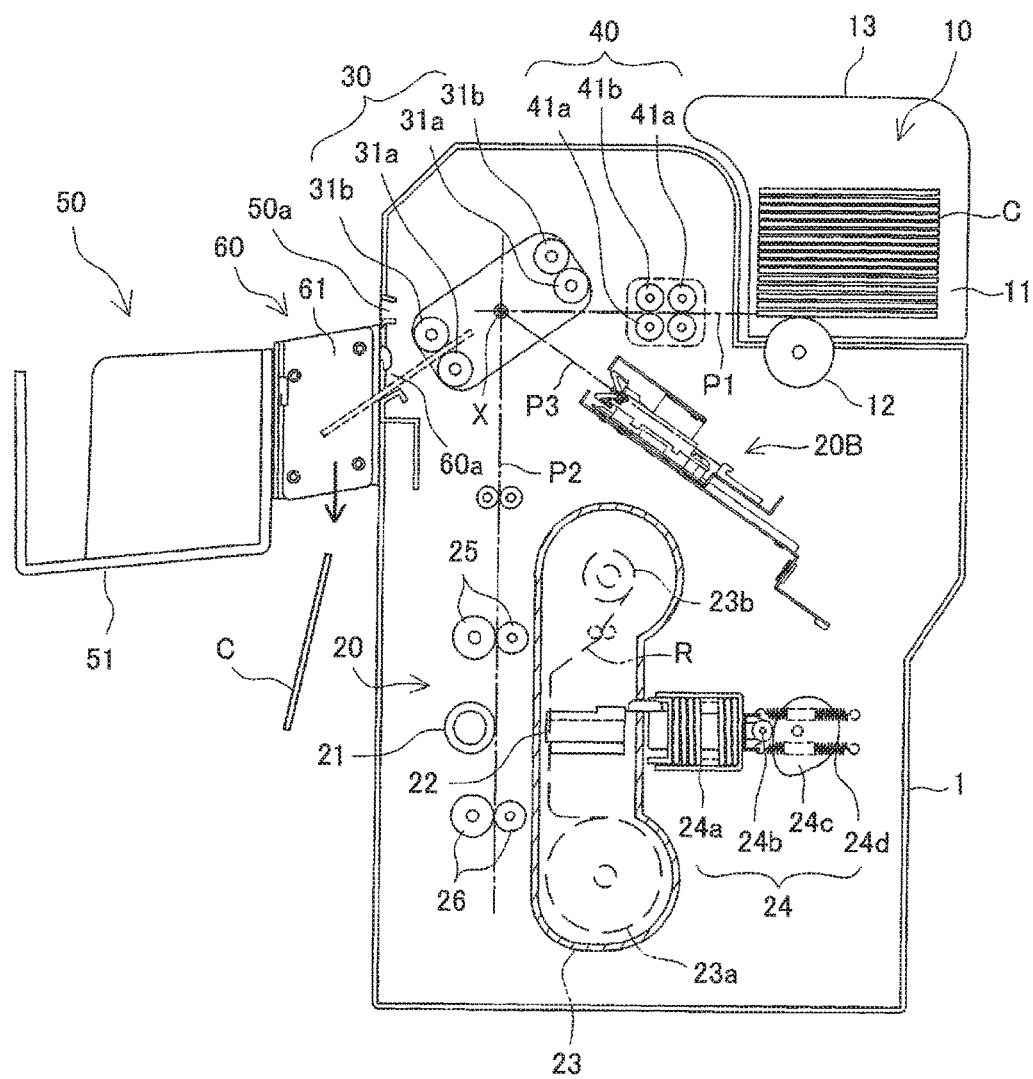
FIG. 8 is a view illustrating a state in which the card processing apparatus of Embodiment 1 discharges an error card to the error card discharge section.

The fourth position is an error card discharge position shown in FIG. 8. This position is a position where the rotation frame 32 is turned 35 degrees counterclockwise from the card receiving position described above, and in this state, the card is transported to the error card discharge section 60.

In other words, the card reverse section 30 in this Embodiment functions as a direction change member for changing the direction of the card C, and a discharge member to discharge the card C to the outside of the housing 1.

In the figure, "40" denotes a cleaner that cleans the card surface. The cleaner 40 herein is comprised of cleaning rollers 41a and press-contact rollers 41b made of rubber materials and the like having stickiness facing each other to be paired with the first transport path p1 therebetween, and is capable of removing dust and the like when the card discharged from the card supply section 10 passes through between paired cleaner rollers.

In this Embodiment, the card that the predetermined processing is finished is discharged to the correct card discharge section 50 or error card discharge section 60 provided on the side opposite to the card supply section 10 with respect to the card reverse section 30. To the correct card discharge section 50 is discharged a card that the processing on the card is correctly finished, and to the error card discharge section 60 is discharged a card (hereinafter, referred to as error card) that an error is detected during the processing on the card.

The card discharge section 50 is comprised of a housing opening 50a, discharge stacker 51 and guide 53. The correct card is discharged from the housing opening 50a by the card reverse section 30, slides down on the guide 53, and is collected in the discharge stacker 51 (see FIG. 7). The error card discharge section 60 is comprised of a housing opening 60a and frame body 61. The lower face of the frame body 61 is an opening, and as shown in FIG. 8, the error card passing through the frame body 61 is discharged outside the housing 1 without any processing. In addition, in this Embodiment, the top face of the frame body 61 is used as the guide 53, and the guide 53 is inclined downward from the housing opening 51a toward a stacker opening 52 of the discharge stacker 51. In this Embodiment, an inclination angle of the guide 53 is set at 10 degrees, and is capable of being set at an optimal angle corresponding to slidability and discharge velocity of the card.

The frame body 61 has a frame body opening 62, a pair of hooks 63 and screw fastening portion 64, the hooks 63 are hooked into a pair of housing hook holes 65 provided between the housing opening 50a and the housing opening 60a, and the frame body 61 is thereby installed in the housing 1. In this state, the frame body 61 and housing 1 are fastened in the screw fastening portion 64 with screws and are fixed.

Further, the discharge stacker 51 has a stacker opening 52 to receive correct cards, and a pair of hooks 54 to fix to the frame body 61, the hooks 54 is hooked into frame body holes 66 provided in the frame body 61, and the discharge stacker 51 is thereby fixed to the frame body 61.

By thus fixing the frame body 61 to the housing and the discharge stacker 51 to the frame body 61, it is possible to install the frame body 61 (error card discharge section 60) and the discharge stacker (correct card discharge section 50) parallel in the discharge direction of the card.

In addition, in this Embodiment, the dimension in the width direction that is the same direction as the card discharge direction is different between the discharge stacker 51 and the frame body 61. In order to collect correct cards, the dimension in the width direction of the discharge stacker 51 is wider than the card width (length in the longitudinal direction of the card: about 86 mm) and is 116 mm. On the other hand, since the error card discharge section 60 in this Embodiment does not need to collect discharged error cards, the frame body 61 does not need to secure space corresponding to the card width. Therefore, the dimension in the width direction of the frame body 61 is 50 mm. By this means, it is possible to arrange the discharge stacker 51 and frame body 61 parallel inside saved space. The dimension is set to obtain a position relationship that the card front end does not contact (card is not caught) the side face on the downstream side in the card discharge direction of the frame body 61, when the card rear end passes through the pinch rollers 31a, 31b on the downstream side in the transport direction of the card reverse section 30.

Figure 7:
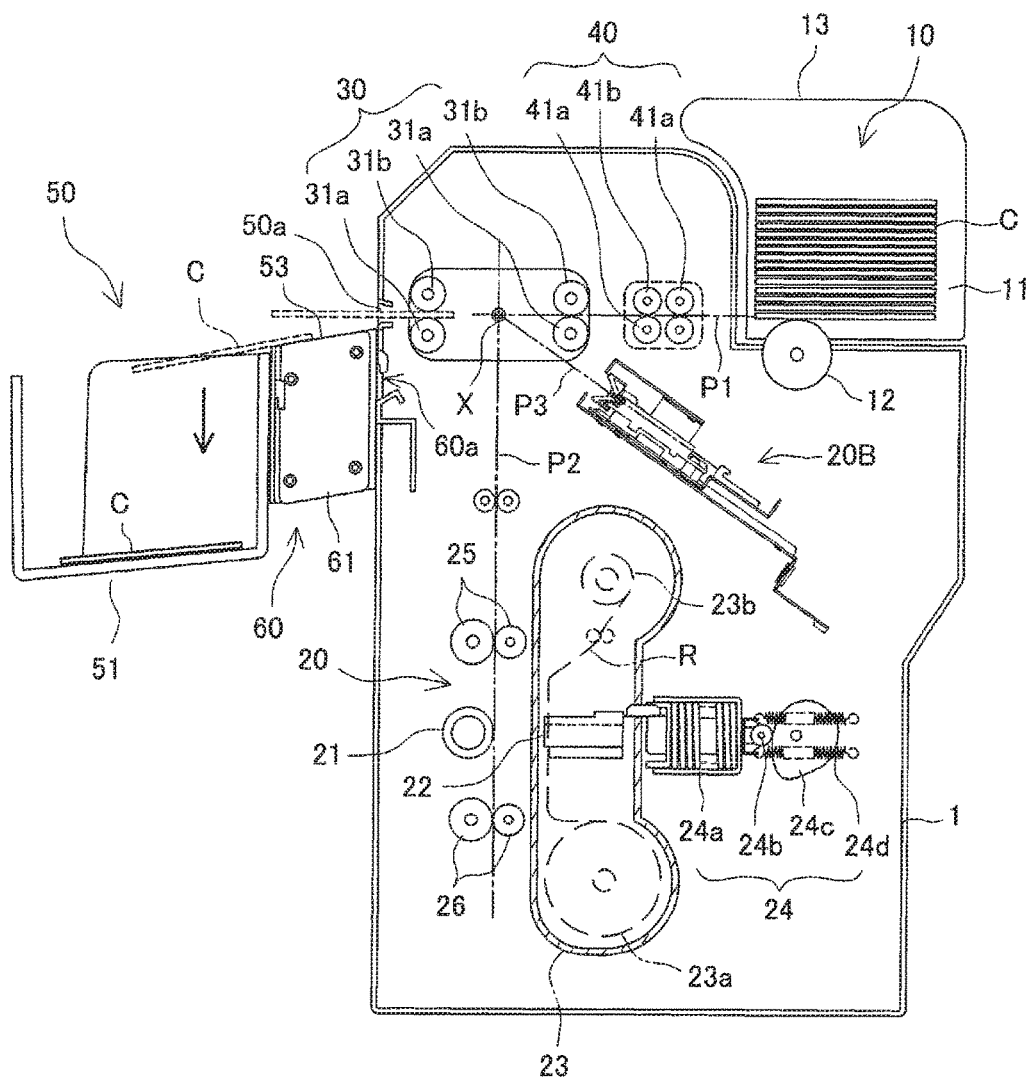
FIG. 7 is a view illustrating a state in which the card processing apparatus of Embodiment 1 discharges a processed card to the correct card discharge section.

Herein, discharge of the correct card and discharge of the error card will be described with reference to FIGS. 7 and 8. FIG. 7 is a view illustrating a state at the time of discharging the correct card. The card that is correctly processed in the printing section 20 and IC reader writer 20B is discharged to the discharge stacker 51 and is collected. At this point, the card reverse section 30 turns to the correct discharge position (the same position as the card receiving position) with the correct card nipped.

Then, the pinch rollers 31a, 31b of the card reverse section 30 are driven to discharge the card toward the discharge stacker 51. When the card rear end passes through the pinch rollers 31a, 31b on the downstream side in the card discharge direction, the discharged card is guided (slides on the upper portion of the guide 53) by the guide 53, and flies until the card arrives at the stacker opening 52. The card arriving at the stacker opening 52 falls without any processing, and is collected inside the discharge stacker 51.

Since the correct card is thus discharged to the discharge stacker 51, the card has to climb over the frame body 61 of the error card discharge section 60 by a transport force of the pinch rollers 31, 31b of the card reverse section 30. Therefore, the card transport velocity in discharging the correct card is set at 360 mm/sec. In addition, the card transport velocity in transporting in the first transport path p1 and the second transport path p2 and the card transport velocity in discharging the error card are set at 300 mm/sec, and the card transport velocity in discharging the correct card is set to be faster. In addition, the card transport velocity in discharging the correct card may be made further faster so that the card does not contact the guide 53. In other words, the guide 53 may be in any forms, as long as the guide is capable of preventing the card from falling before the discharge stacker 51 until the card arrives at the discharge stacker 51.

FIG. 8 is a view illustrating a state at the time of discharging the error card. As described above, the card that an error is detected is discharged to the error card discharge section 60 as the error card. Herein, detection of an error will be described. The error mainly corresponds to the following four items. (1) Communication error in the IC reader writer 20B. When a card is transported to the IC reader writer 20B to perform IC read/write processing, in the case where it is not possible to communicate for a certain time, the case is judged as an error. (2) Error during the printing processing by the printing section 20. Specifically, in the case where the ink ribbon R is broken during the printing processing, it is not possible to continue printing due to winding failure of the ink ribbon R, or a card causes a jam, the case is judged as an error.

(3) Transport error during card transport. In the case where a card causes a jam during card transport, the case is judged as an error. (4) Forcible termination due to cover open or the like before finishing the processing on a card. When the cover of the housing 1 is opened during the card transport or processing, the processing is forcibly terminated. Even when the cover is closed and recovered after forcible termination, the card undergoing the transport or processing is the error card. Upon receiving the above-mentioned information, a control section 100 described later judges as an error, and determines the card existing in one of the first transport path p1, second transport path p2, third transport path p3 and reverse section 30 to be an error card.

The card, which is thus judged as an error for a period during which the card is supplied from the card supply section 10 and is discharged outside the housing 1, is discharged to the error card discharge section 60 as the error card. In addition, the error card includes a card capable of being transported, and a card capable of being not transported, after judging as an error. For example, when a card regarded as an error due to a card jam is forcedly transported, there is a possibility that the apparatus is broken, and therefore, it is necessary to issue an alarm to a user about the error card capable of being not transported to remove manually. Accordingly, the error card discharged to the error card discharge section 60 is the card which is capable of being transported after judging as an error.

The error card capable of being transported after detecting an error will be described below. First, when an error is detected after a card is supplied, the card C is transported to the card reverse section 30. Subsequently, the card reverse section 30 turns to the error card discharge position shown in FIG. 8. In this state, the pinch rollers 31a, 31b of the card reverse section 30 are driven to transport the error card toward the housing opening 60a. The card transport velocity at this point is set at 300 mm/sec, and is a slower velocity than the card transport velocity (360 mm/sec) at the time of discharging the correct card.

When the error card is discharged at a fast velocity like the correct card, there is the risk that the front end of the error card collides with the side face of the frame body 61 intensely and that the card is broken. Accordingly, the card is allowed to contact the side face of the frame body 61, but it is necessary to suppress the card transport velocity to the extent that the card neither collides nor is broken. In addition, the velocity is related to an angle at which the card enters the housing opening 60a in discharging the error card, and the dimension in the width direction of the frame body 61, and therefore, it is possible to set the card transport velocity as appropriate. In addition, this Embodiment adopts the configuration that the error card passes through the frame body 61, falls and is discharged without any processing, and when the card transport velocity is slow, since it is possible to effectively use gravity, the error card is easy to fall directly below. Accordingly, it is desired to slow the card transport velocity to the extent that the card rear end is capable of passing through the frame body opening 62 after going through the pinch rollers 31a, 31b on the downstream side in the card transport direction of the reverse section 30, and that productivity is not decreased. Further, the lower face of the frame body 61 may not bean opening to store discharged cards C in the vertical direction (upright state).

It is possible to drive all operation sections of the above-mentioned processing apparatus by a simple drive control system. As an example, it is possible to adopt a method of driving the kick roller 12 of the card supply section and the rotation frame 32 of the card reverse section 30 by a single motor, and driving the press-contact roller 41b of the cleaner and the pinch roller 31b by another motor, and the like. Each operation component may be driven and controlled by any of drive systems, and power transmission means, electro-magnetic clutch and the like may be used as appropriate. A head drive source that rotates the cam 24c of the back-and-forth drive unit 24 of the information recording section 20 is also used independently, and in using an electromagnetic clutch or the like, it is possible to use power of a transport drive source and the like. Further, in order to feed a next blank card from the card supply section 10 to the first transport path p1 to wait during the processing of a first card in the second transport path p2 or third transport path p3, and thereby reduce the processing time in card successive processing, respective drive sources may be provided to enable the first transport p1 and second transport path p2 to be driven independently.

Figure 9:
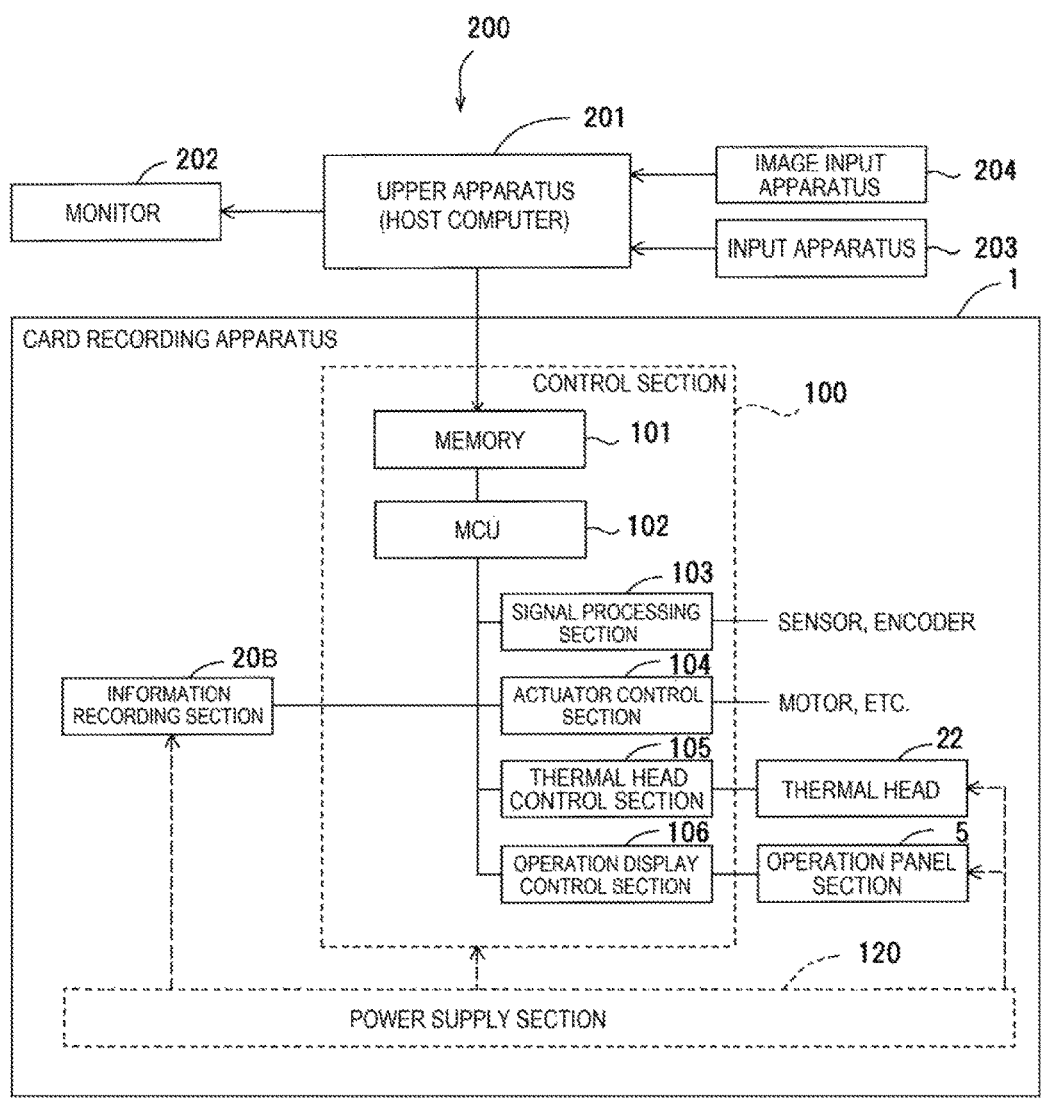
FIG. 9 is a block diagram illustrating a schematic configuration of a control section of the card processing apparatus of Embodiment 1.

The control section and power supply section of the card processing apparatus will be described next. As shown in FIG. 9, the card processing apparatus has the control section 100 that performs operation control of the entire apparatus, and a power supply section 120 that transforms commercial alternating current power supply into direct current power supply that enables each mechanism section, control section and the like to be driven and actuated.

(1) Control Section

The control section 100 is provided with a microcomputer unit (MCU) 102 (hereinafter, referred to as MCU 102) that performs control processing of the entire apparatus. The MCU 102 is comprised of a CPU that operates at a high-speed clock as a central processing unit, ROM that stores programs and program data of the card processing apparatus, RAM that works as a work area of the CPU, and internal bus that connects them.

To the MCU 102 is connected an external bus. On the external bus are connected an interface, not shown, to communicate with an upper apparatus 201, and memory 101 that temporarily stores printing data to form an image on the card C, recording data to record magnetically or electrically onto a magnetic stripe and storage IC of the card C, and the like.

Further, on the external bus are connected a signal processing section 103 that processes signals from various sensors not shown, and encoders of a drive motor of the card reverse section 30, the card transport motor and ink ribbon transport motor, an actuator control section 104 including motor drives that supply drive pulse and drive power to respective motors and the like, a thermal head control section 105 that controls thermal energy to heating elements constituting the thermal head 22, an operation display control section 106 to control an operation panel section 5, and the information recording section A described above.

(2) Power Supply Section

The power supply section 120 supplies actuation/drive power to the control section 100, thermal head 22, operation panel section 5, information recording section 20B and the like.

Card recording processing operation by the processing apparatus with the above-mentioned configuration will be described according to FIGS. 2, 5, 6, 7 and 8.

First, an image input apparatus 204 and input apparatus 203 of the upper apparatus 200 input printing data to print an image on the card C and IC recording data to input electronic recording information to an IC chip of the card C, and the data is stored in the memory 101 of the processing apparatus. Upon receiving these pieces of information (printing/information recording commands), the MCU performs the printing processing and IC recording processing (information recording processing) on the card C. In addition, in this Embodiment, the IC recording processing is first performed, and subsequently, the printing processing is performed. In addition, the card C may be subjected to only the printing processing, or only the IC recording processing, and the IC recording processing may be performed subsequent to the printing processing.

FIG. 2 illustrates an initial state in which a plurality of blank cards C is stacked in the card stacker 11 of the card supply section 10, and when a card creation command is given, the kick roller 12 starts rotating to feed only a card in the lowest position from the card stacker 11 along the first transport path p1. In addition, it is assumed that the IC chip of the card C is disposed on the lower surface side of the card in the figure.

When the card C shifting along the first transport path p1 is fed until the center of the card arrives at the intersection point X of the first, second and third transport paths, the rotation frame 32 is turned to the IC read/write position with the card C nipped by the pinch rollers 31a, 31b (see FIG. 5). In this Embodiment, since the rotation frame 32 turns counterclockwise, the frame 32 turns 325 degrees from the initial state. In the case of a configuration where the card reverse section 30 is capable of turning in both directions, the section 30 is turned 35 degrees clockwise.

When the rotation frame 32 turns 325 degrees and the card C parallel coincides with the third transport path p3, the pinch rollers 31a, 31b of the card reverse section 30 are driven to feed the card C toward the IC reader writer 20B, and when the card arrives at a predetermined position, the IC information recording processing is executed on the card C.

When the IC information recording processing is finished, the pinch rollers 31a, 31b are driven backward to return the card C to the rotation frame 32. Then, when the card C is fed until the center of the card arrives at the intersection point X, the rotation frame 32 is turned to the printing position with the card C nipped by the pinch rollers 31a, 31b (see FIG. 6). When the rotation frame 32 is positioned in the printing position, the pinch rollers 31a, 31b are driven to transport the card C to the printing section 20 along the second transport path p2.

When the card C is transported to a printing start position, the head back-and-forth drive unit 24 of the printing section 20 is actuated and shifts the thermal head 22 toward the card. By this means, the thermal head 22 presses the ink ribbon R to the card frontside f. In this state, while shifting the card to the card reverse section 30, the heating elements of the thermal head 22 are selectively heated and operated to thermal-transfer ink components of the ink ribbon to the card frontside, and by this means, desired image information is printed on the card frontside.

When the printing processing on the card frontside is finished, and the card C is transported to the card reverse section 30 and is fed until the center of the card C arrives at the intersection point X, the rotation frame 32 of the card reverse section 30 is rotated 90 degrees in the counterclockwise direction. By this means, the frontside of the card C is upward, and the card C is discharged to the correct card discharge section 50 at the end of the first transport path p1 (FIG. 7). At this point, the MCU 102 controls the actuator control section 104 so that the card transport velocity by the pinch rollers 31a, 31b is set at 360 mm/sec.

By the aforementioned process, the desired information rerecording processing is executed on one surface of the card. In the case of recording onto both surfaces of the card, the card C transported from the printing section 20 is rotated 180 degrees by the card reverse section 30, and is fed to the printing section 20 again as shown in FIG. 6, and two-sided recording is thereby achieved.

In addition, a card C that an error is detected before discharging the card C to the correct card discharge section 50 is discharged to the error card discharge section 60. Therefore, when an error is detected, the card C is once transported to the card reverse section 30, the rotation frame 32 of the card reverse section 30 is turned to the error card discharge position shown in FIG. 8, and subsequently, the pinch rollers 31a, 31b are driven to discharge the card C toward the housing opening 60a. At this point, the MCU 102 controls the actuator control section 104 so that the card transport velocity by the pinch rollers 31a, 31b is set at 300 mm/sec.

In addition, in the above-mentioned Embodiment, the card C fed from the card supply section 10 is fed to the IC reader writer 20B and printing section 20 by turning the card reverse section 30 in the counterclockwise direction. However, the rotation direction of the card reverse section 30 is not limited, and the rotation direction may be determined as required.

In this Embodiment, in order to discharge two types of cards from the same face of the apparatus housing 1, the second discharge section (error card discharge section 60) disposed on the upstream side (close position) in the card discharge direction from the housing 1, and the first discharge section (correct card discharge section 50) disposed on the downstream side (far position) in the card discharge direction from the housing 1 are disposed parallel substantially in the same direction as the card discharge direction. At this point, by making the card transport velocity in discharging the card to the first discharge section higher than the card transport velocity in discharging the card to the second discharge section, in the case of discharging the card by the same discharge member (card revers section 30), it is possible to discharge the card to the first discharge section disposed in a position far from the housing 1.

In other words, in discharging the card C, the section with a longer distance to the discharge section from the discharge member that is driven so as to provide the card C with the transport force finally (on the most downstream side of the transport path) is made the first discharge section, the section with a shorter length from the discharge member to the discharge section is made the second discharge section, and the card transport velocity in discharging the card C to the first discharge section is made fast. In this Embodiment, the pinch rollers 31a, 31b on the left side in the figure of the card reverse section 30 are the discharge member, and when the distance from the discharge member to the stacker opening 52 of the correct discharge section 50 is compared with the distance from the discharge member to the frame body opening 62 of the error card discharge section 60, the distance from the discharge member to the stacker opening 52 of the correct discharge section 50 is longer. Therefore, the correct card discharge section 50 is the first discharge section. Accordingly, the card transport velocity is set to be fast in discharging the card C to the correct card discharge section 50.

By this means, it is possible to discharge each of two types of cards such as the correct card and error card to the same face side of the apparatus housing, and also in the case of discharging the card C to the correct card discharge section 50 in the position far from the discharge member, alignment characteristics are improved in collected cards C.

Further, in this Embodiment, in discharging the correct card C to the discharge stacker 51, the card C is guided by the guide 53 provided on the top face of the frame body 61. The guide 53 is inclined downward from the housing opening 50a (position in which the card C is discharged by the pinch rollers 31a, 31b) toward the stacker opening 52, and therefore, the card C is smoothly discharged to the discharge stacker 51. In addition, the guide 53 does not need to be integrally formed with the frame body 61, and may be provided as a guide member separately. In other words, it is essential only that the guide 53 is capable of guiding the card C so as to enable the card C to climb over (pass through) the region of the error card discharge section 60 and be discharged to the discharge stacker 51.

Embodiment 1 shows the configuration where the error card discharge section 60 and correct card discharge section 50 are disposed parallel in this order in the card discharge direction from the housing 1, and a configuration may be made where the correct card discharge section 50 is disposed on the housing 1 side.

Figure 10:
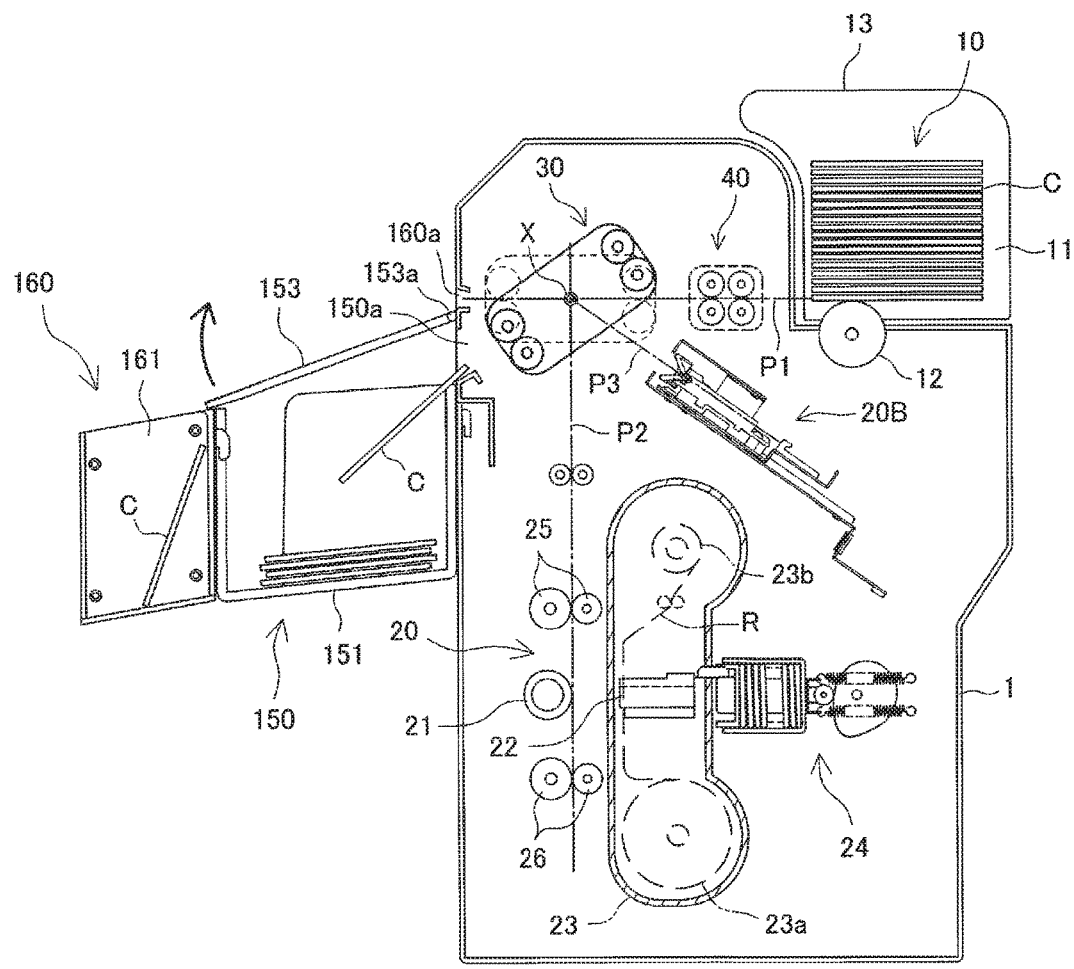
FIG. 10 is a front view illustrating Embodiment 2 of the present invention.

FIG. 10 illustrates a card processing apparatus of Embodiment 2, and shows a configuration where a correct card discharge section 150 and error card discharge section 160 are disposed parallel in this order in the card discharge direction from the housing 1. In addition, components with the same reference numerals as in Embodiment 1 are equivalent or same components, and descriptions of these components are omitted to avoid redundant explanations.

In Embodiment 2, a discharge stacker 151 is fixed to the housing 1, and a frame body 161 (error card discharge box) of the error card discharge section 160 is fixed to the side face on the downstream side in the card discharge direction of the discharge stacker 151 in the shape of a hook. The correct card C is discharged to the discharge stacker 151 from the card reverse section 30 (state in which the turn angle is 35 degrees counterclockwise) shown by the solid line. At this point, the correct card C passes through a housing opening 150a and stacker opening 152, and is collected inside the discharge stacker 151.

In discharging the correct card to the discharge stacker 151, the MCU 102 controls the actuator control section 104 so that the card transport velocity by the pinch rollers 31a, 31b is set at 300 mm/sec.

On the other hand, a card, which is judged as an error card because an error is detected during the processing on the card C, is discharged to the error card discharge section 160. The error card C is discharged from the card reverse section 30 (the same position as the initial position) shown by dashed lines to the error card discharge section 160. At this point, the error card C passes through a housing opening 160a, slides down on a guide 153, and is discharged inside the frame body 161. As distinct from Embodiment 1, in the frame body 161, the top face is an opening. Then, in the lower face is formed a support face that supports the error card C, and it is configured to be able to store the error card C in an upright state. In addition, the error card discharge section 160 may not have the frame body 161, and may be made a configuration that the card C sliding down on the guide 153 falls outside the housing 1 without any processing. In this case, the region on the downstream side of the guide 153 is the error card discharge section 160.

In addition, the width dimension (length in the same direction as the discharge direction of the card C) of the discharge stacker 151 in FIG. 10 is 116 mm as in Embodiment 1, the width dimension of the frame body 161 is 60 mm, the discharge stacker 151 is wider than the width dimension (86 mm: length in the same direction as the transport direction of the card C) of the card C, and the frame body 161 is narrower than the width dimension of the card C. In other words, since the frame body 161 does not need to load the discharged error card, it is possible to make the width dimension of the frame body 161 narrower than the width dimension of the card C. By this means, it is possible to arrange the discharge stacker 151 and frame body 161 parallel inside saved space.

Figure 11:
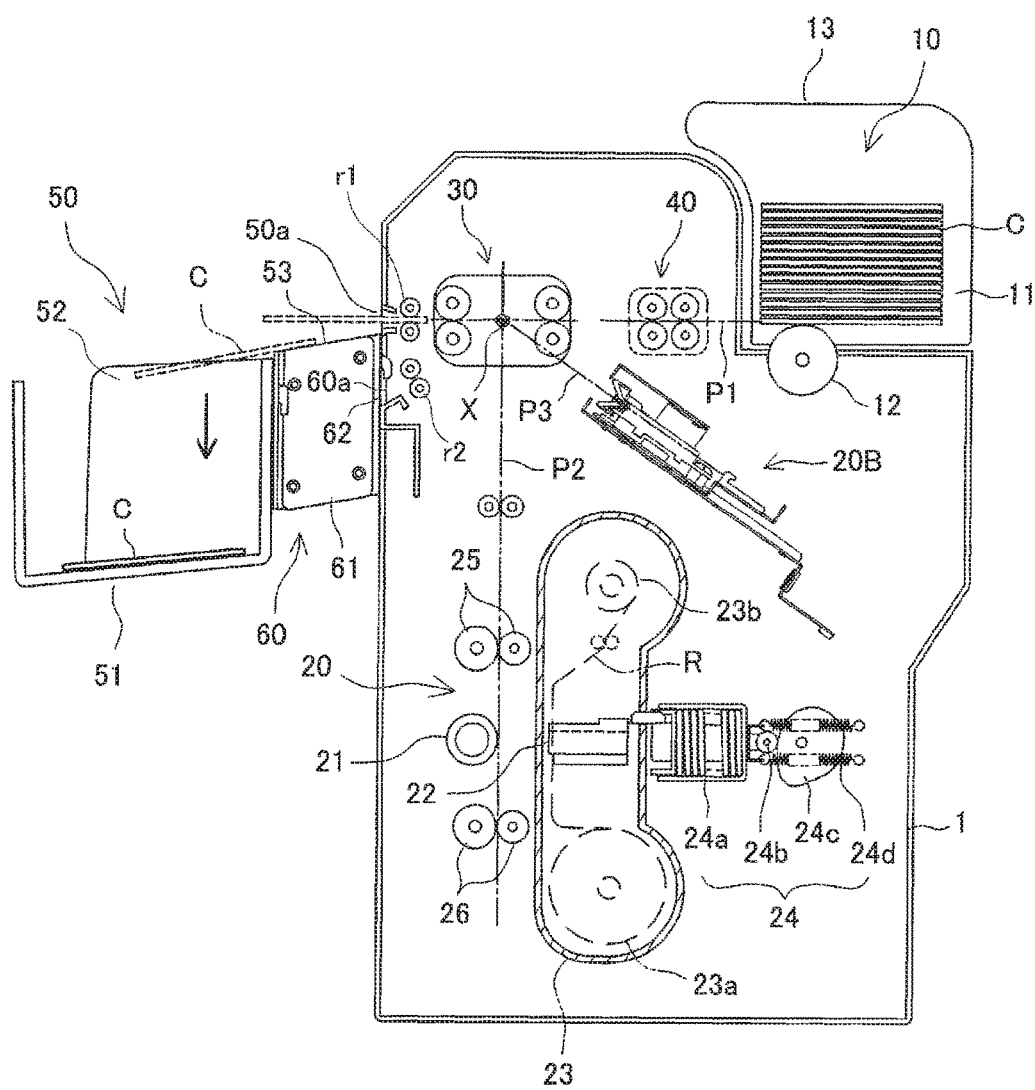
FIG. 11 is a front view illustrating a Modification of Embodiment 1 of the invention.

In addition, in discharging the card C, all the Embodiments described above show the aspect where the discharge member that is driven so as to provide the card C with the transport force finally is the pinch rollers 31a, 31b of the card reverse section 30, and at both the time of discharging the correct card and the time of discharging the error card, the discharge member is the pinch rollers 31a, 31b. Alternatively, as shown in FIG. 11, a discharge roller r1 may be a member that provides the card with the transport force finally in discharging the card C to the correct card discharge section 50 that is the first discharge section, and a discharge roller r2 may be a member that provides the card with the transport force finally in discharging the card C to the error card discharge section 60 that is the second discharge section. The discharge roller r1 and discharge roller r2 may be driven by the same motor, or may be driven by different motors. Then, when a distance from the discharge roller r1 to the stacker opening 52 is compared with a distance from the discharge roller r2 to the frame body opening 62, the distance from the discharge roller r1 to the stacker opening 52 is longer, and therefore, the MCU 102 controls transport velocities of the discharge rollers r1, r2 so that the card transport velocity by the discharge roller r1 is faster than the card transport velocity by the discharge roller r2.

Figure 12:
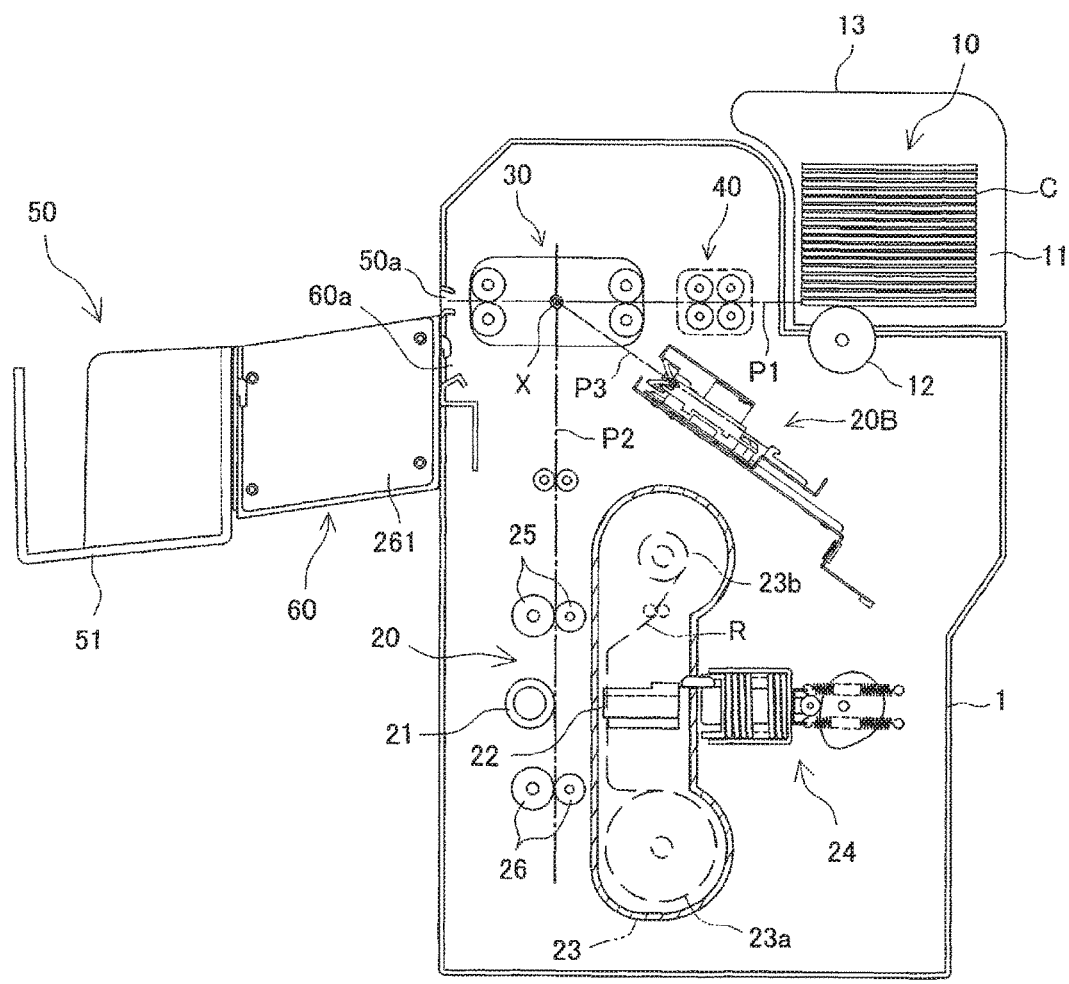
FIG. 12 is a front view illustrating another Modification of the invention.

Further, Embodiment 1 shows the configuration where the width dimension (dimension in the same direction as the card discharge direction) of the discharge stacker 51 of the correct card discharge section 50 is different from the width dimension of the frame body 61 of the error card discharge section 60, and the width dimension of the frame body 61 is shorter than the width dimension of the discharge stacker 51, and on the premise that the card transport velocity in transporting the card C to the discharge stacker 51 is higher than the card transport velocity in discharging the card C to a discharge stacker 261, as shown in FIG. 12, the width dimension of the discharge stacker 51 and the width dimension of the frame body 261 may be made the same dimension. Because the distance from the housing 1 (card reverse section 30 that discharges the card) to the discharge stacker 51 is long, there is a possibility that the card C does not reach the discharge stacker 51 unless the card is discharged vigorously. In this case, the frame body 261 (discharge stacker 261) may be in the shape of a stacker (lower face is not an opening) to collect the error card which passes through the opening 60a and is discharged. In addition, in this case, the correct card may be discharged to the discharge stacker 261, while discharging the error card to the discharge stacker 51.

Further, in the case of collecting cards in the discharge stacker 261, when the card C is discharged vigorously in the same manner as in discharging the card C to the discharge stacker 51, there is a possibility that card alignment characteristics degrade inside the discharge stacker 261, and therefore, it is desired to make a difference in the card transport velocity between the case of discharging the card C to the discharge stacker 51 and the case of discharging the card C to the discharge stacker 261 (in discharging the card C, the card transport velocity is made faster in the case of discharging to the discharge section positioned far from the pinch rollers 31a, 31b of the card reverse section 30 that are the discharge member driven to provide the card C with the transport force finally).

Furthermore, it is obviously that the width dimension of the frame body 261 disposed in the position close to the discharge member (pinch rollers 31a, 31b) can be made larger than the width dimension of the discharge stacker 51 disposed in the position far from the discharge member (see the discharge stacker 151 and frame body 161 in FIG. 10 also).

Still furthermore, in the above-mentioned Embodiments, in the media processing apparatus having two discharge sections disposed parallel on one side of the apparatus, since the frame body (61, 151, 261) of the discharge section (60, 150) provided on the upstream side in the discharge direction of a medium has the guide portion (53, 153) to discharge the medium to the discharge section (50, 160) provided on the downstream side, it is not necessary to provide an independent discharge path to discharge the medium to each discharge section, and it is possible to obtain the effect of enabling the apparatus to be compact.

In addition, this application claims priority from Japanese Patent Application No. 2016-131917, Japanese Patent Application No. 2016-131916, and Japanese Patent Application No. 2016-134691, incorporated herein by reference.

The invention claimed is:
1. A media processing apparatus for performing processing on a recording medium to discharge, comprising:
   an apparatus housing;
   a medium processing section adapted to perform predetermined processing on the recording medium;
   a discharge member adapted to discharge the recording medium processed in the medium processing section; and
   a plurality of discharge sections to which the recording medium is discharged by the discharge member, wherein the plurality of discharge sections is disposed parallel in a same direction as a discharge direction of the recording medium by the discharge member on one side of the apparatus housing, and is comprised of a first discharge section including a first frame body and a second discharge section including a second frame body, a length dimension in the discharge direction of the first frame body is longer than a length dimension in the discharge direction of the recording medium, and a length dimension in the discharge direction of the second frame body is shorter than the length dimension in the discharge direction of the recording medium,
   wherein the discharge member is arranged on an upstream side of the first discharge section and the second discharge section in the discharge direction of the recording medium, and the discharge member is comprised of a direction change section adapted to turn with the recording medium being nipped to shift to a first position to discharge the recording medium to the first discharge section and a second position to discharge the recording medium to the second discharge section, and change a direction of the recording medium.

2. The media processing apparatus according to claim 1, wherein the first frame body is a discharge stacker to load the recording medium.

3. The media processing apparatus according to claim 1, further comprising:
a medium supply section adapted to supply the recording medium,
wherein the medium supply section, the discharge member, the second discharge section and the first discharge section are disposed sequentially along a transport direction of the recording medium.

4. The media processing apparatus according to claim 1, wherein the discharge member further turns to a third position to transport the recording medium to the medium processing section.

5. The media processing apparatus according to claim 1, wherein the first discharge section is disposed on a downstream side of the second discharge section in the discharge direction of the recording medium, and the apparatus is provided with a guide member to pass the recording medium above the second discharge section to discharge to the first discharge section.

6. The media processing apparatus according to claim 5, wherein the guide member is comprised of a top face of the second frame body.

7. The media processing apparatus according to claim 1, further comprising:
an error detection member adapted to detect whether or not the recording medium is correctly processed in the medium processing section,
wherein the first discharge section is comprised of a discharge stacker to collect the recording medium processed correctly in the medium processing section, and to the second discharge section is discharged the recording medium with an error detected in the error detection member.

8. The media processing apparatus according to claim 1, wherein the second frame body of the second discharge section is disposed between the first discharge section and the direction change section in the discharge direction of recording medium, and includes a top face extending from the one side of the apparatus housing toward the first discharge section and adapted to guide the recording medium discharged from the direction change section to the first discharge section so that when the direction change section discharges the recording medium in the first position, the second frame body allows the recording medium to slide along the top face to the first discharge section.

9. The media processing apparatus according to claim 8, wherein the second frame body of the second discharge section further comprises a side face extending from the top face and facing toward the direction change section, the side face including a frame body opening adapted to receive the recording medium discharged from the direction change section in the second position.

10. The media processing apparatus according to claim 9, wherein the second frame body of the second discharge section further comprises an opening opposite to the top face in respect to the side face, the opening adapted to discharge the recording medium entering the second frame body from the frame body opening to outside of the apparatus housing.

11. A media processing apparatus for performing processing on a recording medium to discharge, comprising:
an apparatus housing;
a medium processing section adapted to perform predetermined processing on the recording medium;
an error detection member adapted to detect whether or not the recording medium is correctly processed in the medium processing section;
a discharge member adapted to discharge the recording medium processed in the medium processing section; and
a plurality of discharge sections to which the recording medium is discharged by the discharge member, wherein the plurality of discharge sections is disposed parallel in a same direction as a discharge direction of the recording medium by the discharge member on one side of the apparatus housing, and is comprised of a first discharge section including a first frame body and a second discharge section including a second frame body of which a length dimension in the discharge direction is shorter than that of the first frame body,
wherein the discharge member is arranged on an upstream side of the first discharge section and the second discharge section in the discharge direction of the recording medium, and discharges the recording medium with an error detected in the error detection member to the second discharge member, and
the discharge member is comprised of a direction change section adapted to turn with the recording medium being nipped to shift to a first position to discharge the recording medium to the first discharge section and a second position to discharge the recording medium to the second discharge section, and change a direction of the recording medium.

12. The media processing apparatus according to claim 11, wherein the first frame body is a discharge stacker to load the recording medium.

13. The media processing apparatus according to claim 11, further comprising:
a medium supply section adapted to supply the recording medium,
wherein the medium supply section, the discharge member, the second discharge section and the first discharge section are disposed sequentially along a transport direction of the recording medium.

14. The media processing apparatus according to claim 11, wherein the discharge member further turns to a third position to transport the recording medium to the medium processing section.

15. The media processing apparatus according to claim 11, wherein the first discharge section is disposed on a downstream side of the second discharge section in the discharge direction of the recording medium, and the apparatus is provided with a guide member to pass the recording medium above the second discharge section to discharge to the first discharge section.

16. The media processing apparatus according to claim 15, wherein the guide member is comprised of a top face of the second frame body.

* * * * *